United States Patent [19]

Saito et al.

[11] 4,053,908
[45] Oct. 11, 1977

[54] EXPOSURE MULTIPLE SETTING DEVICE FOR PROGRAMMING ELECTRIC SHUTTER

[75] Inventors: Takeo Saito, Yotsukaido; Yuzuru Takazawa, Togane; Shinji Nagaoka, Yotsukaido; Yoichi Seki, Shisui, all of Japan

[73] Assignee: Seiko Koki Kabushiki Kaisha, Japan

[21] Appl. No.: 720,368

[22] Filed: Sept. 3, 1976

[30] Foreign Application Priority Data

Sept. 4, 1975 Japan .......................... 50-122021[U]

[51] Int. Cl.² .............................................. G03B 7/08
[52] U.S. Cl. ........................................ 354/31; 351/51
[58] Field of Search ................... 354/31, 50, 51, 60 R; 356/222

[56] References Cited

U.S. PATENT DOCUMENTS

| | | | |
|---|---|---|---|
| 3,730,063 | 5/1973 | Koleayashi et al. | 354/31 |
| 3,838,433 | 9/1974 | Imura | 354/31 X |
| 3,882,511 | 5/1975 | Tsujimoto et al. | 354/51 X |
| 3,974,509 | 8/1976 | Tsuda et al. | 354/51 |

Primary Examiner—L. T. Hix
Assistant Examiner—M. L. Gellner
Attorney, Agent, or Firm—Robert E. Burns; Emmanuel J. Lobato; Bruce L. Adams

[57] ABSTRACT

In a programming electric shutter for a camera, the photoconductive element receiving light from the subject to be photographed comprises a plurality of photoelectric bodies. An exposure multiple setting device permits using one or more of the photoelectric bodies selectively according to the exposure factors or the sensitivity of the film to be used.

5 Claims, 5 Drawing Figures

EXPOSURE MULTIPLE SETTING DEVICE FOR PROGRAMMING ELECTRIC SHUTTER

FIELD OF INVENTION

The present invention relates to programming electric shutters for cameras, and particularly to an exposure multiple setting device for programming shutters.

BACKGROUND OF THE INVENTION

When a subject to be photographed is bright, the opening process of the cmaera shutter until the opening blade is fully released will vary together with an elapse of time. The aperture diameter and the time will be determined according to the brightness of the subject. When the subject to be photographed is dark, only the time will vary after the opening blade is fully opened. Thus, exposure is determined automatically according to the brightness of the subject. The $\gamma$ characteristic of the photoconductive element of the above mentioned programming shutter is not linear as will be seen from curves I and II of FIG. 3. When the subject to be photographed is bright, that is within the range in which the opening blade is not fully opened, and an aperture diameter and a time are determined simultaneously, the value of $\gamma$ must be smaller than 1 while within the range when the subject to be photographed is dark and only the time varies, after the opening balde is fully opened, the value of $\gamma$ must be approximately 1.

The introduction of an exposure multiple in a programming shutter requiring the above mentioned characteristics of a photoconductive element cannot be achieved by the conventional methods of changing-over the time-limiting capacitors of the shutter circuit or changing the switching levels in switching circuits. The relationship between brightness and the resistance value of a photoconductive element for different film sensitivities is illustrated in FIG. 3. Assuming that curve I represents the relationship between brightness and the resistance value of the photoconductive element for film having a ASA rating of 100, the relationship in the case of ASA 400 is represented by curve II. The curves show the resistance values of the photoconductive elements at points where the EV value in both cases is identical. There is the following relationship between the curves of ASA 100 and ASA 400:

$$R\ EVn = R'\ EV(n - 2)$$

where,

| | R: | Resistance value of ASA 100 |
|---|---|---|
| | R': | Resistance value of ASA 400 |

When it is attempted to introduce a film sensitivity in the manner mentioned above, by changing-over time-limiting capacitors or changing switching levels, the above formula will be realized within the range of $\gamma=1$ but not within the range of $\gamma<1$. For instance, assuming that a ¼ capacity of ASA 100 is used, when the capacity of a time-limiting capacitor is ASA 400, the time determined in the RC circuit will be 1 : 4. If taking this as the resistance value of the photoconductive element varying apparently, $$R\ 400 = \tfrac{1}{4} R\ 100$$

where,

| | R 400: | resistance for ASA 400 |
|---|---|---|
| | R 100: | resistance for ASA 100 |

A resistance for ASA 400 or R 400 is as shown by the dotted line curve III in FIG. 3, always in relation of ¼ to the resistance R = 100 of ASA 100 in Ev value. Accordingly, the formula may be brought into realization within the range of $\gamma=1$ but within the range of $\gamma<1$ as explained above and as is clear from FIG. 3, the error will become larger.

SUMMARY OF INVENTION

The present invention takes the above mentioned points into consideration and makes it possible to introduce an exposure multiple in a programming shutter with high accuracy. In accordance with the invention, the photoconductive element which receives light from the subject to be photographed consists of a plurality of photoelectric bodies which are adapted to be changed over individually or selected as a predetermined combination according to the selected exposure multiples or sensitivity of the film to be used.

BRIEF DESCRIPTION OF DRAWING

The nature, objects and advantages of the invention will be more fully understood from the following description in conjunction with the accompanying drawing, in which.

DETAILED DESCRIPTION OF PREFERRED EMBODIMENT

Figure 1:
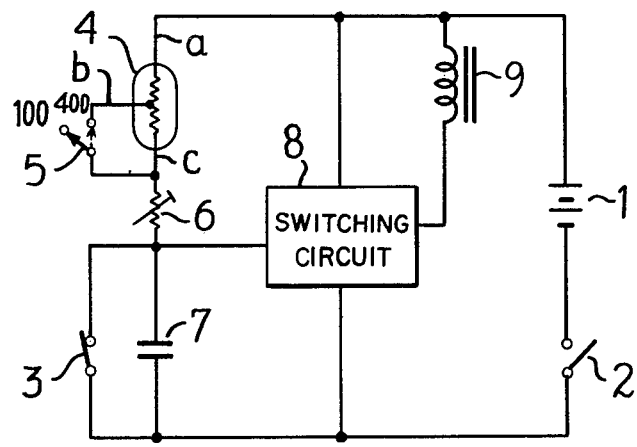
FIG. 1 is an electric shutter circuit having an exposure multiple setting device in accordance with the present invention.

An electric shutter control circuit in accordance with the invention as illustrated by way of example in FIG. 1, comprises a power source 1, a power switch 2, a photoconductive element 4, an adjustable resistance 6 for matching the characteristics of the photoconductive element to that of the shutter, a time-limiting capacitor 7 and a trigger switch 3 which normally short circuits the capacitor 7 and is opened in synchronization with the opening movement of the shutter blade. The time-limiting capacitor 7 is connected in series with the photoconductive element 4 and the adjustable resistance 6. The input of a switching circuit 8 is fed with the voltage across the time-limiting capacitor 7 and the output of the switching circuit is reversed when the charging voltage reaches a predetermined level. The switching circuit 8 is of known construction and may, for example, comprise a Schmidt circuit. The switching circuit 8 controls an electromagnet 9 for controlling the closing movement of the shutter blade.

In accordance with the invention, the photoconductive element 4 is a triode element comprising two photoelectric bodies $CdS_1$ and $CdS_2$. As shown schematically in FIG. 2, the photoconductive element 4 has three leads $a$, $b$ and $c$ connected respectively to electrode sections A, B and C. The photoconductive body $CdS_1$ is disposed between the electrode sections A and B while the photoconductive body $CdS_2$ is disposed between electrode sections B and C. A change-over switch 5 is connected between the leads $b$ and $c$ of the photoconductive element 4. When the change-over switch is opened as shown in solid lines in FIG. 1, the photoconductive bodies $CdS_1$ and $CdS_2$ are in series with one another so that the photoconductive element has the characteristics shown by the curve I in FIG. 3. When the change-over switch 5 is closed as shown in dotted lines in FIG. 1, the photoconductive body $CdS_2$ is short circuited so that only the photoconductive body $CdS_1$ is effective. In this condition, the photoconductive element 4 has the characteristics represented by the curve II in FIG. 3. The characteristics of the photoconductive bodies $CdS_1$ and $CdS_2$ are selected so as to provide the resistance characteristics shown respectively in curves I and II in FIG. 3 according to the position of the change-over switch 5.

Figure 2:
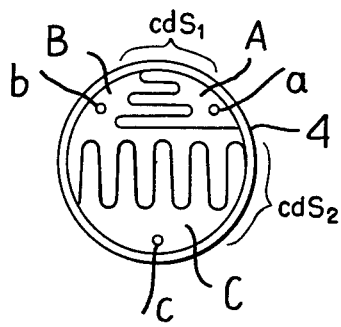
FIG. 2 is an enlarged schematic view showing the light receiving surface of a photoconductive element for use in the embodiment of FIG. 1.

The operation of the circuit shown in FIG. 1 using a photoconductive element of the kind illustrated in FIG. 2 will now be described. When the release button the camera is depressed, the power switch 2 is turned on to supply current to the electromagnet 9 for controlling the blade closing operation of the shutter under control of the switching circuit 8. Upon further depression of the release button, the shutter blade is mechanically released and simultaneously the trigger switch 3 is opened so that the time-limiting capacitor 7 is no longer short circuited. Consequently, the time-limiting capacitor 7 will begin to be charged through the photoconductive element 4 and the adjustable resistance 6. In this instance, when the change-over switch 5 for selecting film sensitivity is set for ASA 100 as shown in full lines in FIG. 1, both photoconductive bodies $CdS_1$ and $CdS_2$ of the photoconductive element 4 will be connected in series with the adjustable resistance 6 and time-limiting capacitor 7. The resistance of the RC timing circuit is thus the values of $CdS_1$ and $CdS_2$ plus the adjustable resistance 6. As the adjustable resistance 6 remains constant during operation of the shutter, the rate of charging of the capacitor 7 will depend on the resistance values of $CdS_1$ and $CdS_2$ and hence on the brightness of the subject being photographed.

The charging voltage of the capacitor 7 is applied to the input of the switching circuit 8 and when this charging voltage reaches a predetermined value, this switching circuit is reversed so as to interrupt the current supplied to the electromagnet 9. The closing operation of the shutter blade is thereby effected to complete the exposure.

When the change-over switch 5 for setting the film sensitivity is switched to the position for ASA 400 as shown in dotted lines in FIG. 1, the photoconductive body $CdS_2$ is short circuited and hence the effective resistance of the photoconductive element 4 is only that of the photoconductive body $CdS_1$. Hence, the resistance connected in series with the capacitor 7 will be only that of $CdS_1$ and the adjustable resistance 6. Thus, in the case of ASA 400 film, the time will be determined by this RC constant.

Figure 3:
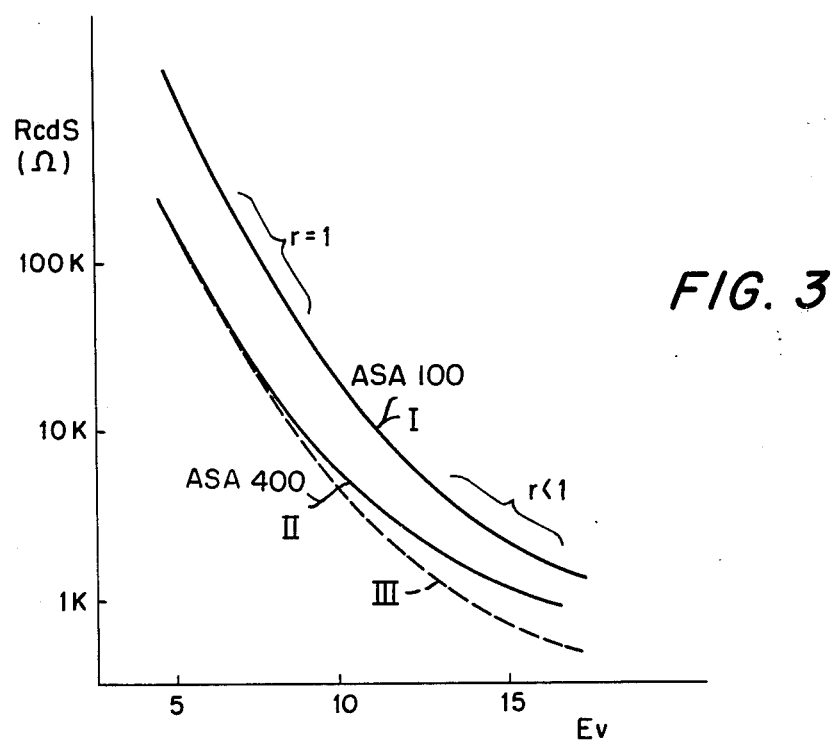
FIG. 3 shows curves representing the resistance characteristics of a photoconductive element for use in a programming shutter.

Accordingly, the introduction of an exposure multiple in accordance with the present invention by connecting a plurality of CdS bodies in different combinations as described above can permit such change of ideal resistance characteristics as shown in curves I and II in FIG. 3 even when $\gamma$ of a photoconductive element is not equal to 1 over the whole range of operation.

In the preferred embodiment of the invention, there are provided two photoconductive sections within a single photoconductive element by the use of a triode photoconductive element, a selection being made of different sections or different combinations by taking leads from each electrode. A plurality of photoconductive bodies are thus combined in a single unit.

Figure 4:
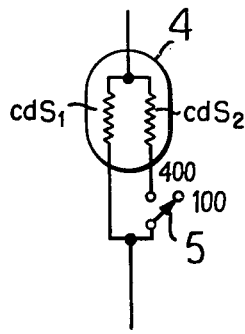
FIGS. 4 and 5 illustrate schematically other examples of connecting photoconductive elements for exposure multiple setting.
Figure 5:
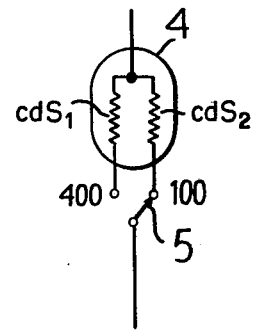

Other switching arrangements for the photoconductive bodies of the photoconductive element 4 are illustrated by way of example in FIGS. 4 and 5. In FIG. 4, when the change-over switch 5 is in the position shown for ASA 100, the photoconductive body $CdS_2$ is open circuited and hence only the photoconductive body $CdS_1$ is effective. When the change-over switch 5 is switched to the position for 400 ASA, the photoconductive bodies $CdS_1$ and $CdS_2$ are connected in parallel with one another.

In FIG. 5, when the change-over switch 5 is in position for ASA 100 as shown, the photoconductive body $CdS_1$ is open circuited and hence only the photoconductive body $CdS_2$ is effective. When the change-over switch 5 is switched to the position for 400 ASA, the photoconductive body $CdS_2$ is open circuited and hence only the conductive body $CdS_1$ is effective and constitutes the resistance of the photoconductive element 4. Thus, as illustrated in FIG. 1, 4 and 5, a selection is made between a plurality of photoconductive bodies in a single photoconductive unit according to the sensitivity of the film being used. In this manner, ideal resistance characteristics of the photoconductive element can be achieved for each type of film.

What we claim is:

1. A control circuit for a programming electric shutter of a camera comprising: a d.c. power supply, photoconductive means for sensing the brightness of a subject to be photographed, a timing capacitor connected in series with said photoconductive means between positive and negative terminals of said power supply, trigger switch means normally short-circuiting said capacitor and operable simultaneously with the opening of the shutter to permit charging of said capacitor by current flowing through said photoconductive means, a switching circuit connected with said capacitor and responsive to the voltage level to which said capacitor is charged, shutter closing means controlled by said switching means to close the shutter when the capacitor voltage reaches a predetermined level, said photoconductive means comprises a plurality of discrete photoconductive bodies in a single unit, and switch means for selectively connecting said discrete photoconductive bodies in circuit with said capacitor to control the rate of charging of said capacitor as a function of the brightness of the subject to be photographed, thereby permitting the characteristics of said photoconductive means to be matched to the speed of the film used in the camera.

2. A control circuit according to claim 1, in which said photoconductive means comprises a triode photoconductive element with two photoconductive bodies, three electrodes and three leads.

3. A control circuit according to claim 2, in which said switch means comprises means connected with leads of said triode photoconductive element and operable alternatively to connect one only of said photoconductive bodies in series with said capacitor or connecting said photoconductive bodies in series with one another and with said capacitor.

4. A control circuit according to claim 2, in which said switch means comprises means connected with leads of said triode photoconductive element and operable selective to connect one or the other of said photoconductive bodies in series with said capacitor.

5. A control circuit according to claim 2, in which said switch means comprises means connected with leads of said triode photoconductive element and operable alternatively to connect one only of said photoconductive bodies in series with said capacitor or connecting said photoconductive elements in parallel with one another.

* * * * *